Patented Mar. 17, 1953

2,632,009

UNITED STATES PATENT OFFICE 2,632,009

N-ACETYLPYRAZINECARBOXAMIDE AND METHODS OF PREPARING THE SAME

Sidney Robert Safir, River Edge, N. J., assignor to American Cyanamid Company, New York, N. Y., a corporation of Maine No Drawing. Application January 18, 1952, Serial No. 267,190

7 Claims. (Cl. 260—250)

1

This invention relates to certain new N-acetylpyrazinecarboxamide compounds, the salts thereof and methods of making the same.

The new compounds of this invention, when in the form of their free bases, may be represented by the following general formula:

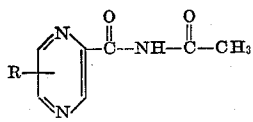

in which R represents a member selected from the group consisting of hydrogen and lower alkyl radicals, for instance methyl and ethyl. The free bases, as represented by the above formula, are slightly basic compounds and therefore form salts with mineral acids under anhydrous conditions. The new class of compounds can be isolated in the form of such acid addition salts, if desired.

It is intended that this invention cover the new compounds of the above class regardless of for what purpose they are employed and indeed the new class of compounds are useful in many fields of chemistry, and in particular, the field of medicinal chemistry. For instance, the new class of compounds of this invention have antiseptic properties and can be employed as antiseptics wherever a general antiseptic is advantageous. It is also probable that many new uses will be found for the new class of compounds of this invention. For instance, N-acetylpyrazinecarboxamide has been found to be active against tubercle bacilli infections in mice and it is possible that the new class of compounds will find extended utility as tuberculostatic materials.

While it is intended that this invention cover the new class of compounds by whatever method they are prepared, a particularly convenient method of preparing the new compounds has been discovered and it is intended that this new method also constitute a part of this invention. The new method comprises heating pyrazinecarboxamide or the appropriately substituted derivative thereof with acetic anhydride. The new reaction may be represented by the following general equation:

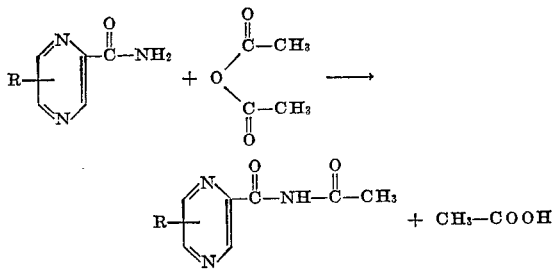

where R is as defined above.

2

The new reaction of this invention can be performed in the presence of an inert solvent or diluent if desired but it is preferably performed in the absence of the same. Suitable materials for this purpose may be illustrated by benzene and xylene. It is often advantageous, however, to employ an excess of acetic anhydride as a diluent since this results in added convenience of operation and improved yields. When employing an additional quantity of acetic anhydride as a diluent, a two to ten fold excess is preferable although of course any reasonable excess can be employed.

The new process of this invention can be performed at any temperature above about 80° C. up to and including the reflux temperature of the reaction mixture, but the reaction is favored by high temperatures and therefore temperatures in the range of about 120° C.–140° C. are preferred. When operating in the absence of an inert solvent or diluent, a convenient procedure has been found to comprise heating the reaction mixture at the reflux temperature of acetic anhydride, or in other words, at about 140° C. At temperatures in the neighborhood of 80° C., about twenty-four hours should be allowed for a reasonably complete reaction and at temperatures of about 140° C., approximately thirty minutes should be allowed. The approximate time for a reasonably complete reaction at intermediate temperatures can be obtained by extrapolation.

The invention will be more particularly illustrated by the following specific example in which all parts are by weight unless otherwise indicated.

Example

A mixture of 6 parts by weight of pyrazinecarboxamide and 30 parts by volume of acetic anhydride is refluxed seventy-five minutes and then evaporated to dryness in vacuo. The resulting residue is sublimed at a pressure of 0.05 mm. of mercury and the resulting white crystalline sublimate added to sufficient hot benzene to dissolve substantially all of the material. This mixture is then heated to boiling, cooled to room temperature and filtered free of an insoluble impurity. Evaporation of the benzene solvent gives N-acetylpyrazinecarboxamide as a white crystalline solid.

The N-acetyl-alkylpyrazinecarboxamides can, of course, be prepared by the same procedure as above except that the appropriate alkylpyrazinecarboxamide is employed in place of pyrazinecarboxamide. For instance, N-acetyl-6-methylpyrazinecarboxamide can be prepared by the procedure of the above example by substituting a molar equivalent of 6-methylpyrazinecarboxamide [prepared by amidation of 6-methylpyrazinoic acid (J. Am. Chemical Society 68, 527–8)] for the 6 parts by weight of pyrazinecarboxamide employed in the above example.

I claim:
1. Compounds selected from the group consisting of those represented by the formula:

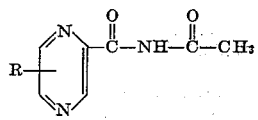

in which R represents a member selected from the group consisting of hydrogen and lower alkyl radicals; and addition salts thereof with strong acids.

2. The new compound N-acetylpyrazinecarboxamide.

3. The new compound N-acetyl-6-methylpyrazinecarboxamide.

4. A method of preparing compounds selected from the group consisting of those represented by the formula:

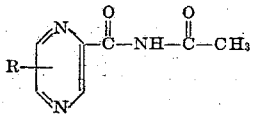

in which R represents a member selected from the group consisting of hydrogen and lower alkyl radicals; and addition salts thereof with mineral acids, which comprises heating together, at a temperature of from about 80° C. to the reflux temperature of the reaction mixture, acetic anhydride and a compound represented by the formula:

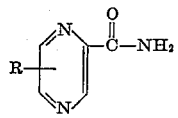

where R is as previously defined.

5. The method of claim 4 where the reaction is performed at a temperature of about 120° C. to 140° C.

6. The method of claim 4 wherein a two to ten fold excess of acetic anhydride is employed.

7. A method of preparing N-acetylpyrazinecarboxamide which comprises heating pyrazinecarboxamide with a two to ten fold excess of acetic anhydride at a temperature of about 120° C. to 140° C.

SIDNEY ROBERT SAFIR.

No references cited.